United States Patent [19]

Bedwell et al.

[11] Patent Number: 4,599,936
[45] Date of Patent: Jul. 15, 1986

[54] INTEGRAL STRUT AND PISTON GROOVE PROTECTOR

[75] Inventors: Thomas J. Bedwell, Holland, Mich.; Earl J. Clarke, Fountain Town, Ind.

[73] Assignee: Wickes Manufacturing Company, Southfield, Mich.

[21] Appl. No.: 726,251

[22] Filed: Apr. 22, 1985

[51] Int. Cl.$^4$ .................................................. F16J 1/04
[52] U.S. Cl. ................................ 92/228; 29/156.5 R; 277/189.5
[58] Field of Search ................. 92/211, 222, 225, 227, 92/228; 123/193 P; 277/189.5; 29/156.5 R

[56] References Cited

U.S. PATENT DOCUMENTS

| | | | |
|---|---|---|---|
| 3,391,613 | 7/1968 | Hocke | 92/228 |
| 3,535,986 | 2/1968 | Daub | 92/228 |
| 3,545,772 | 12/1970 | Zollner | 277/189.5 |

Primary Examiner—Stephen F. Husar
Attorney, Agent, or Firm—A. Thomas Kammer

[57] ABSTRACT

An integral strut and groove protector assembly is provided for incorporation within a light metal piston. The assembly includes a ring groove protector, an expansion control strut, and a connecting member connecting the groove protector and strut. All are stamped as one piece from a sheet metal substrate. The piston is cast about two such assemblies arranged in opposing relation within a mold. Each ring groove protector traverses an arc of somewhat less than one hundred eighty degrees to facilitate the manufacturing process.

17 Claims, 5 Drawing Figures

INTEGRAL STRUT AND PISTON GROOVE PROTECTOR

BACKGROUND OF THE INVENTION

1. Field of the Invention

The invention relates to expansion control struts and piston ring groove protectors as employed in internal combustion engines.

2. Background of the Invention

Internal combustion engine pistons are made from aluminum alloys having relatively low expansion and sufficient hardness for good machinability. Such pistons include a head portion having piston ring grooves and a skirt portion extending therefrom.

Ring groove protectors are often provided to protect the pistons, particularly in engines which are subject to long periods of use at full loads. Truck engines, tractor engines, and industrial engines are commonly so equipped. In the absence of such protection, the ring grooves could enlarge vertically and thereby damage the piston rings. An armored groove does not tend to enlarge. Ferrous ring groove protectors are well known for this purpose.

Expansion control steel struts are employed in conjunction with aluminum pistons for controlling the thermal expansion thereof. They are cast in the piston to control the radial expansion of the piston skirt during temperature changes. When the molten aluminum solidifies about the struts, a bimetallic action is created which causes the aluminum thrust faces to expand at a slower rate than the cast iron bore within which the piston is located. As the engine cools, these thrust faces contract at a slower rate than the bore. This decreases skirt to bore clearance and minimizes "cold slap."

Ring groove protectors and expansion control struts have generally been constructed as separate articles. The struts are cast in the piston and the groove protectors are assembled by hand. Alternatively, the groove protectors may be cast in the piston head as discussed in U.S. Pat. No. 3,512,791.

A groove protector and strut assembly may also be provided as an integral unit as disclosed in U.S. Pat. No. 3,535,986. Such an arrangement facilitates the manufacturing process as the entire unit is placed in a mold prior to casting.

SUMMARY OF THE INVENTION

An integral strut and piston groove protector is provided which may be manufactured efficiently and is easily incorporated within a piston. The assembly includes an arcuate groove protector which extends about an arc of less than one hundred and eighty degrees. A strut is secured thereto by means of a connecting member. The groove protector, strut, and connecting member are preferably of integral construction and stamped from the same piece of ferrous material. The stamping is then formed into the desired configuration.

A piston is provided which includes two of the above assemblies incorporated therein. The fact that the ring groove protecting members do not extend completely around a piston groove does not have a material effect upon its operation. Since two identical assemblies may be used for each piston, manufacturing efficiency is enhanced.

A method of manufacture is also provided wherein an integral groove protector, strut, and connecting member assembly is stamped from a sheet of selected material, bent to form, and cast within a piston.

DETAILED DESCRIPTION OF THE INVENTION

Figure 1:
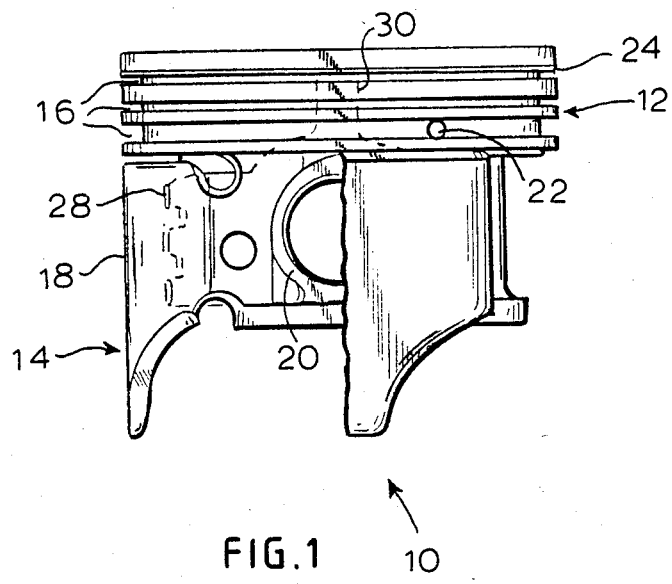
FIG. 1 is a partially cut-away side elevation view of a piston including a pair of integral groove protector/strut assemblies.

A piston 10 having head 12 and skirt 14 portions is shown in FIG. 1. The piston includes a plurality of ring grooves 16, a thrust face 18, and wrist pin bosses 20. The bottom groove is relatively wide and includes a plurality of oil drain escapes 22 therein.

A pair of ring groove protectors 24 is provided in one of the grooves. In the embodiment shown in FIG. 1, they are positioned in the uppermost groove. Each extends about an arc of 150°–179°, preferably about 170°. A plurality of inwardly extending teeth 26 are provided for exerting radial forces on the ring portion to retain it within the groove.

An expansion control strut 28 is connected to each ring groove protector 24 by a connecting member 30 having about a ninety degree bend therein. The connecting member may be of any selected width or include more than the single connecting piece shown. The struts 28 are cast within the piston pin bosses 20 and the skirt 14. Each end 31 of the struts 28 is bent at an obtuse angle with respect to the strut body. The connecting member is embedded within the piston head 12.

The ring groove protector/strut assemblies 32 are positioned in opposing relation within the piston 10. The ends of the ring groove protectors 24 are accordingly spaced about ten degrees from each other.

Figure 3:
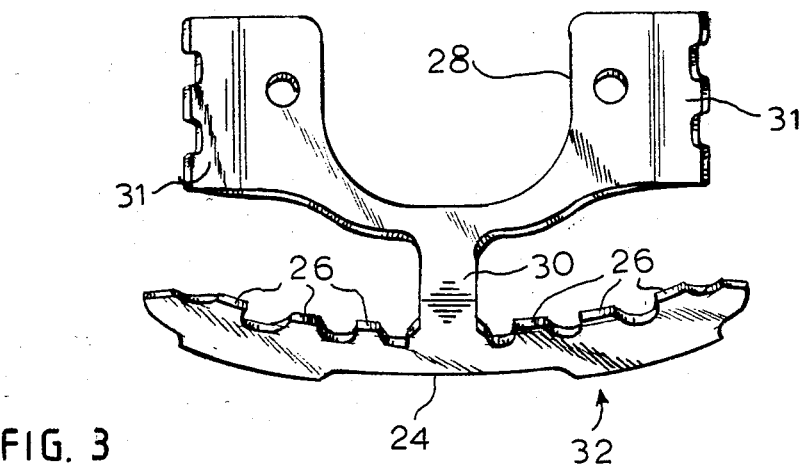
FIG. 3 is a perspective view of an integral groove protector/strut assembly according to the invention.
Figure 2:
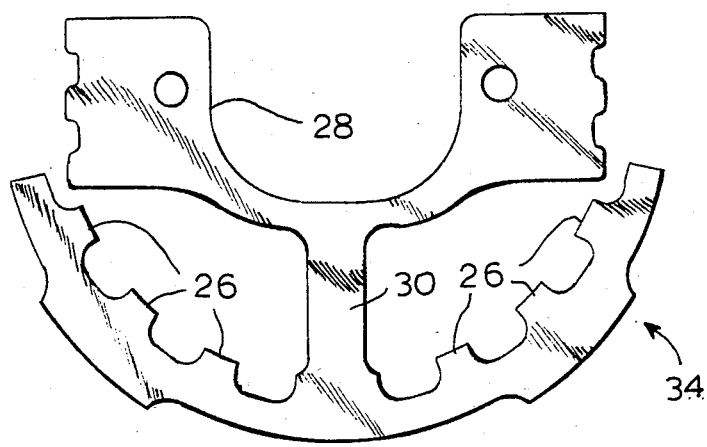
FIG. 2 is a top plan view of a flat stamping including a groove protecting member and a strut member.
Figure 5:
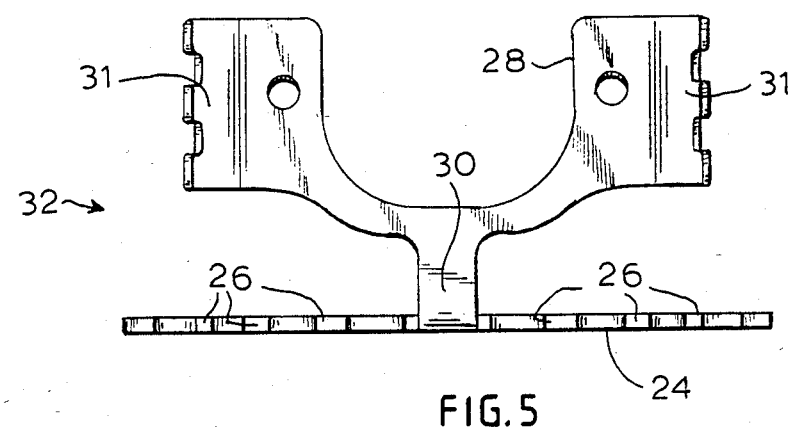
FIG. 5 is a side elevation view thereof.
Figure 4:
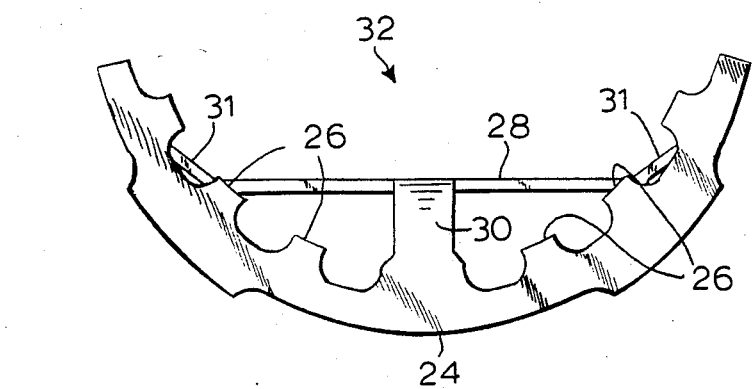
FIG. 4 is a top plan view thereof.

An assembly 32 as described above is manufactured by initially stamping a piece of ferrous sheet metal to produce a flat preform 34 as shown in FIG. 2. The preform is then positioned within a press (not shown) where the connecting member 30 and the ends 31 of the strut 28 are bent. The finished assembly 32 is shown in FIGS. 3–5.

A pair of assemblies 32 are placed in opposing, symmetrical positions within a mold (not shown) for casting a light metal piston 10. Since the ring groove protectors 24 are each less than 180°, they do not need to be manufactured with the precision that would be necessary if they were to extend the entire 360° about a piston groove 16. The mold would also have to be constructed with greater precision to accommodate two 180° ring segments.

A piston 10 is cast about the assemblies 32 to produce the construction shown in FIG. 1. This construction may be turned or ground to a precise exterior configuration.

It will be appreciated that the ring groove protector 24, the strut 28, and the piston 10 may have different constructions from those shown herein. Different materials may also be employed providing they produce the desired bimetallic action in the piston skirt and sufficient protection for the piston rings.

What is claimed is:

1. An integral strut and groove protector assembly for a piston comprising:
    a ring groove protector having an arcuate body traversing an arc of less than one hundred eighty degrees;
    an expansion control strut for controlling the thermal expansion of a piston; and
    a connecting member connecting said ring groove protector and said expansion control strut, said connecting member having a bend therein.

2. An assembly as defined in claim 1 wherein said ring groove protector, said expansion control strut, and said connecting member are stamped as one piece from the same sheet of ferrous material.

3. An assembly as defined in claim 1 wherein said bend in said connecting member is about ninety degrees.

4. An assembly as defined in claim 1 wherein said ring groove protector includes a plurality of radially inwardly extending teeth.

5. An assembly as defined in claim 1 wherein said arcuate body traverses an arc of about one hundred seventy degrees.

6. An assembly as defined in claim 1 wherein said arcuate body traverses an arc between one hundred fifty and one hundred seventy-nine degrees.

7. A piston assembly comprising:
    a piston body including a head portion and a skirt portion, said head portion including a plurality of annular grooves defined within its exterior surface;
    first and second strut and groove protector assemblies at least partially embedded within said piston body;
    each assembly including a ring groove protector having an arcuate body traversing an arc of less than one hundred and eighty degrees, each of said arcuate bodies extending within one of said annular grooves;
    each assembly also including an expansion control strut at least partially embedded within said skirt portion; and
    each assembly further including a connecting member connecting said ring groove protector and said expansion control strut, each said connecting member having a bend therein.

8. A piston assembly as defined in claim 7 wherein said ring groove protector, expansion control strut, and connecting member of each assembly are stamped as one piece from the same sheet of ferrous material.

9. A piston assembly as defined in claim 8 wherein said integral strut and groove protector assemblies are in opposing relation to each other.

10. A piston assembly as defined in claim 8 wherein said bend in each connecting member is about ninety degrees.

11. A piston assembly as defined in claim 7 wherein each ring groove protector traverses an arc of between one hundred fifty and one hundred seventy-nine degrees.

12. A piston assembly as defined in claim 11 wherein each of said arcuate bodies traverses an arc of about one hundred seventy degrees.

13. A method for manufacturing a piston assembly, comprising:
    providing a flat sheet of ferrous material;
    stamping said flat sheet to produce a preform defining a first integral assembly including a ring groove protector, an expansion control strut, and a connecting member connecting said ring groove protector and said expansion control strut;
    bending said connecting member so that said ring groove protector and expansion control strut are in different planes;
    casting a piston about said ring groove protector, expansion control slot, and connecting member so that they are at least partially embedded therein.

14. A method as defined in claim 8 including the step of bending said connecting member about ninety degrees.

15. A method as defined in claim 13 including the step of stamping said flat sheet such that said ring groove protector traverses an arc of less than one hundred and eighty degrees.

16. A method as defined in claim 13 including the step of providing a second integral assembly substantially identical to said first integral assembly, bending the connecting member of said second integral assembly, and casting said piston about both of said integral assemblies.

17. A method as defined in claim 16 including the step of positioning said integral assemblies in opposing relation to each other.

* * * * *